United States Patent [19]

Geller

[11] 4,307,465
[45] Dec. 22, 1981

[54] DIGITAL COMMUNICATIONS RECEIVER

[75] Inventor: William L. Geller, Framingham, Mass.

[73] Assignee: GTE Laboratories Incorporated, Waltham, Mass.

[21] Appl. No.: 84,976

[22] Filed: Oct. 15, 1979

[51] Int. Cl.$^3$ .............................................. H04B 1/16
[52] U.S. Cl. ...................................... 375/76; 455/161
[58] Field of Search ................... 375/76, 92; 328/162, 328/164; 455/161; 329/170; 307/362

[56] References Cited

U.S. PATENT DOCUMENTS

| | | | |
|---|---|---|---|
| 2,287,925 | 6/1942 | White | 455/161 |
| 2,428,011 | 9/1947 | Chatterjea | 328/164 |
| 3,008,007 | 11/1961 | Koker | 328/164 |
| 3,119,065 | 1/1964 | Blake | 329/170 |
| 3,388,331 | 6/1968 | Rawley | 455/161 |
| 3,502,906 | 3/1970 | Aulhorn | 328/164 |
| 3,516,000 | 6/1970 | Slechta | 329/170 |
| 3,569,739 | 3/1971 | Stolman | 307/362 |
| 3,588,857 | 6/1971 | Gessner | 340/172 |
| 3,644,853 | 2/1972 | Ma | 455/169 |
| 3,671,866 | 6/1972 | Rutherford | 375/76 |
| 3,676,781 | 7/1972 | Worcester | 455/161 |
| 3,742,362 | 6/1973 | Meurer | 455/169 |
| 3,746,999 | 7/1973 | Freen | 329/170 |
| 3,757,228 | 9/1973 | Klank | 455/169 |
| 3,947,774 | 3/1976 | Glennon | 455/169 |
| 4,029,904 | 6/1977 | Papeschi | 375/76 |
| 4,143,324 | 3/1979 | Davis | 329/170 |

Primary Examiner—Harold I. Pitts
Attorney, Agent, or Firm—David M. Keay

[57] ABSTRACT

Receiving apparatus for receiving and detecting binary encoded continuous wave RF signals. The binary signal is detected by a superregenerative detector. The detected signal and a DC reference voltage are applied to an amplifier which produces a signal corresponding to the detected signal but shifted to vary in amplitude about an axis at the DC reference voltage. The shifted signal and the DC reference voltage are applied to a comparator which produces an output signal at a predetermined voltage level when the shifted signal is greater than the DC reference voltage and at 0 volts when the shifted signal is less than the DC reference voltage. Thus a noise-free binary signal having sharply defined voltage transitions is obtained.

3 Claims, 2 Drawing Figures

DIGITAL COMMUNICATIONS RECEIVER

BACKGROUND OF THE INVENTION

This invention relates to RF communication receivers. More particularly, it is concerned with receivers for receiving and detecting digital information transmitted as amplitude modulated RF signals.

For certain applications such as digital remote control systems highly sensitive low cost radio receivers are required. One such system in which an RF carrier is 100% amplitude modulated by an NRZ (nonreturn to zero) binary signal is described in patent application Ser. No. 075,783 filed Sept. 17, 1979, now Patent No. 4,259,594, issued Mar. 31, 1981, by Jeffrey R. Fox, Arthur Margolies, and Rob Moolenbeek entitled "Electrical Power Supply Apparatus" and assigned to the assignee of the present application. The signal transmitted is a binary encoded continuous wave RF signal.

SUMMARY OF THE INVENTION

High sensitivity error-free reception and detection of binary encoded amplitude modulated RF signals is provided by receiving apparatus in accordance with the present invention. The receiving apparatus includes input means for receiving a binary encoded amplitude modulated RF signal. Detector means coupled to the input means produces a signal having amplitude variations representing the binary modulating signal. The apparatus also includes reference voltage means for producing a DC reference voltage. An amplifier means is coupled to the detector means and to the reference voltage means and produces a signal corresponding to the signal from the detector means which varies in amplitude about an axis at the DC reference voltage level. A comparator means coupled to the amplifier means and to the reference voltage means produces an output signal which is at a first voltage level when the voltage of the signal from the amplifier means is greater than the DC reference voltage and at a second voltage level when the voltage of the signal from the amplifier means is less than the DC reference voltage. Thus, the output signal from the comparator means is noise-free with sharp transitions between two voltage levels providing a reproduction of the original binary modulating signal.

For a better understanding of the present invention, together with other and further objects, advantages, and capabilities thereof, reference is made to the following discussion and appended claims in connection with the above described drawings.

DETAILED DESCRIPTION OF THE INVENTION

Figure 1:
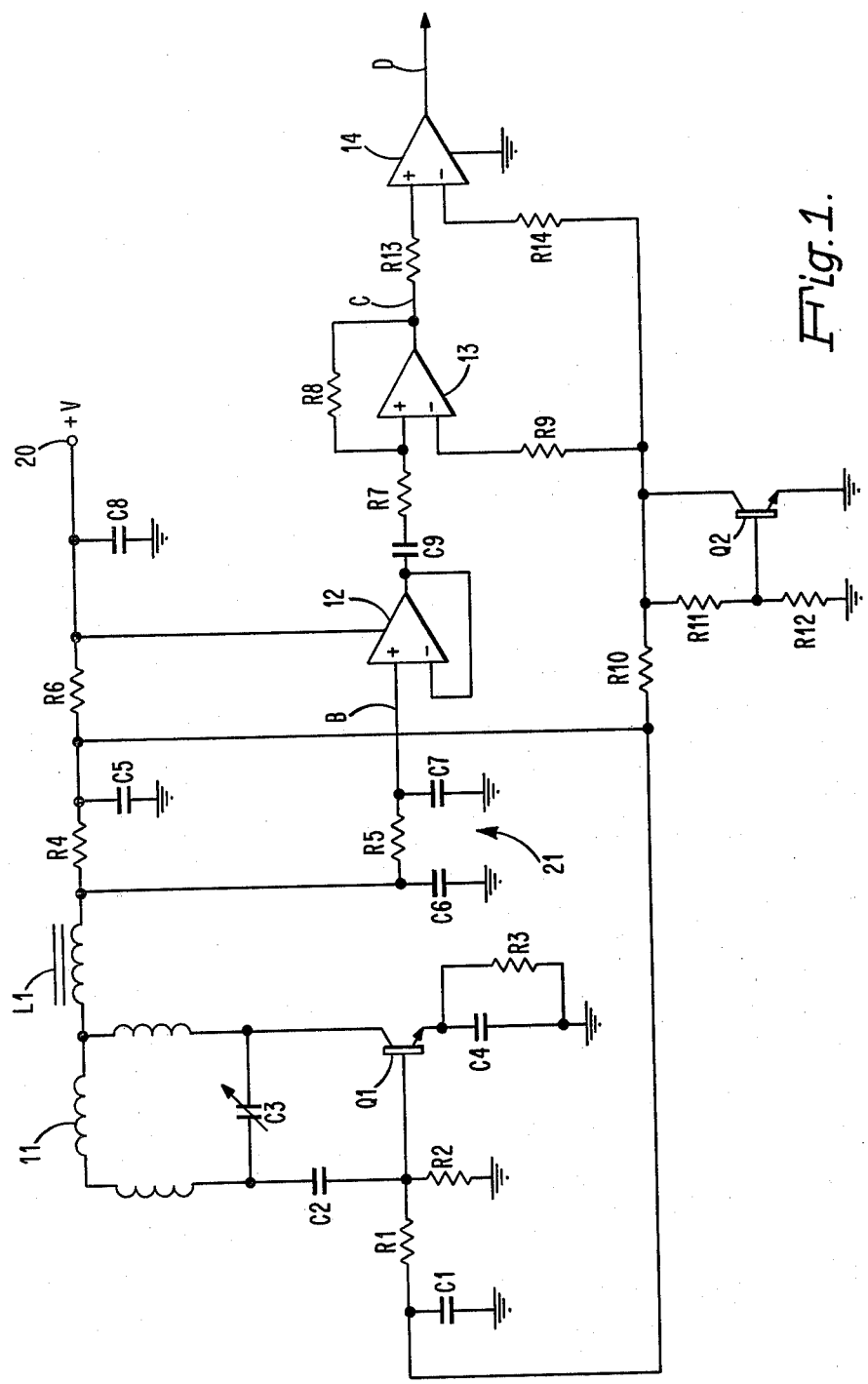
FIG. 1 is a schematic circuit diagram of receiving apparatus in accordance with the present invention.

The receiver in accordance with the present invention as illustrated in the schematic circuit diagram of FIG. 1 is adapted to receive binary encoded continuous wave RF signals of the type transmitted by the encoder and transmitter described in the aforementioned application of Fox, Margolies, and Moolenbeek. The signal employs an RF carrier of 350 MHz which is 100% amplitude modulated by an NRZ (nonreturn to zero) binary signal. With the NRZ code, logic 0's and logic 1's are represented by the duration or period between voltage transitions. In the present specific embodiment a period between transitions of 1.85 milliseconds represents a logic 0 and a period between transitions three times as long, 5.55 milliseconds, represents a logic 1.

The receiving apparatus as illustrated in FIG. 1 includes an inductance or coil 11 which may be laminated onto the circuit board on which the components of the receiver are mounted. The coil 11 functions as the antenna of the receiver. The coil 11 and a variable capacitance C3 are connected in parallel to provide a tuned circuit. The collector of an NPN transistor Q1 is connected to one juncture of the coil 11 and the capacitance C3. The base of the transistor is connected to the juncture of two resistances R1 and R2 which form a voltage divider between the voltage source and ground providing bias to the base. A capacitance C2 which provides collector-to-base feedback for the transistor is connected between the base of the transistor and the other juncture of the coil 11 and capacitance C3. A parallel arrangement of a capacitance C4 and a resistance R3 is connected between the emitter of the transistor Q1 and ground.

The section of the receiver as described above functions as a superregenerative detector. The tank circuit of coil 11 and capacitance C3 is tuned to a resonant frequency of approximately the carrier frequency of 350 MHz. The feedback capacitance C2 causes the transistor Q1 to oscillate at a frequency close to the resonant frequency of the tank circuit. These oscillations are periodically quenched by the buildup of voltage across capacitance C4. The network of capacitance C4 and resistance R3 determines the quench frequency of approximately 600 KHz. When an RF input signal is received, the quench frequency changes thereby changing the average collector current in transistor Q1, which detects the presence of an RF signal.

An RF choke L1 is connected to a tap at one-third of the length of the coil 11 to couple the current variations due to the RF signal to capacitance C6 while providing RF isolation. The detected signal is applied to a low pass filter 21 of capacitance C7 and resistance R5. In the specific embodiment under discussion the low pass filter passes frequencies below about 5 KHz.

From the low pass filter 21 a signal is applied to three amplifier stages in series. The first amplifier stage 12 is arranged as a unity gain buffer. From the buffer 12 the signal is coupled through a capacitance C9 and resistance R7 to a second amplifier stage 13. The amplification produced by the amplifier 13 depends upon the input resistance R7 and the feedback resistance R8.

A DC reference voltage is applied to the inverting input of the amplifier 13. The DC reference voltage is produced by an arrangement of resistances R10, R11, and R12 which form a voltage divider between the voltage source and ground and a second NPN transistor Q2. The DC reference voltage in the specific embodiment under discussion is about 2.5 volts. The output of amplifier 13 is a voltage waveform similar to that at its non-inverting input but shifted to vary in amplitude about an axis at the DC reference voltage level.

The output of amplifier 13 is coupled by way of resistance R13 to the non-inverting input of a third amplifier stage 14. The DC reference voltage is applied to its inverting input by way of resistance R14 which is equal to resistance R13. This stage operates as a comparator producing an output signal at a particular voltage level, specifically 10 volts, when the input voltage at the non-inverting input is greater than the DC reference voltage and at 0 volts when the input voltage is less than the DC reference voltage.

Various other components serve to couple DC operating potential from the power supply terminal 20 to the elements of the circuit while isolating the various sections of the receiver from unwanted frequencies.

Figure 2:
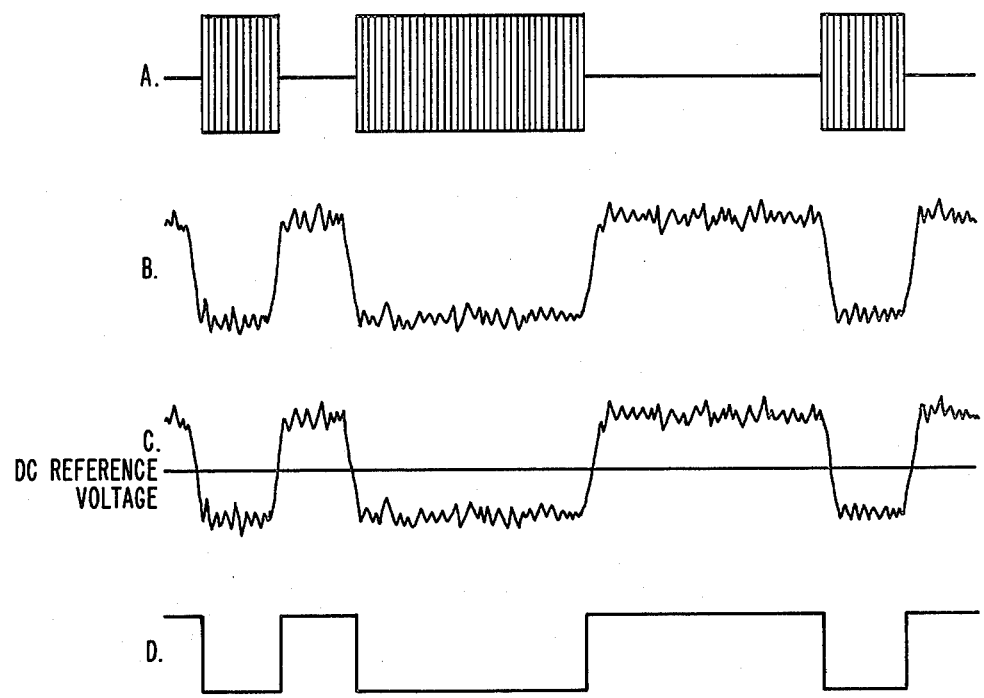
FIG. 2 are sample voltage waveshapes of a received signal and an output signal and at two intermediate points in the apparatus of FIG. 1.

Operation of the apparatus may best be understood with reference to the waveforms of FIG. 2. Waveform A represents a received signal of the type transmitted by the encoder and transmitter described in the application of Fox, Margolies, and Moolenbeek. The received signal is an RF carrier of 350 MHz which has been 100% amplitude modulated by an NRZ coded pulse train as explained hereinabove. The modulating signal is detected by the superregenerative detector and the detected signal is conducted by the RF choke L1 to the low pass filter 21. The output of the filter at point B of FIG. 1 is illustrated by waveform B of FIG. 2. The detected and filtered signal may contain low frequency noise components as shown.

The signal as illustrated by waveform B passes through the buffer 12 to amplifier 13. The output of amplifier 13 as shown in waveform C of FIG. 2 is the same as waveform B except that it is amplified and its axis is shifted so that it varies in amplitude about the DC reference voltage as an axis.

The output of the amplifier 13 is applied to the comparator 14 which also receives the same DC reference voltage. The resulting output of the comparator 14 is illustrated in waveform D of FIG. 2. The final detected signal is a reproduction of the binary NRZ modulating pulse train with sharply defined transitions between two predetermined voltage levels. The signal is free of noise and other frequency components which may be present in the system.

A specific embodiment of the receiver illustrated and having the parameters discussed hereinabove employs the following components:

| | |
|---|---|
| Stage 12 } Stage 13 } Stage 14 } | LM324 Integrated Circuit |
| Q1 | FTR129A |
| Q2 | 2N3904 |
| L1 | .47 µh |
| R1 | 100 KΩ |
| R2 | 47 KΩ |
| R3 | 6.8 KΩ |
| R4 | 15 KΩ |
| R5 | 3.3 KΩ |
| R6 | 47Ω |
| R7 | 1 KΩ |
| R8 | 20 KΩ |
| R9 | 20 KΩ |
| R10 | 1 KΩ |
| R11 | 3.3 KΩ |
| R12 | 1 KΩ |
| R13 | 1 KΩ |
| R14 | 1 KΩ |
| C1 | 0.1 µf |
| C2 | 33 pf |
| C3 | 3-11 pf |
| C4 | .001 µf |
| C5 | 100 µf |
| C6 | .01 µf |
| C7 | .01 µf |
| C8 | 100 µf |
| +V | 5 volts D.C. |

While there has been shown and described what is considered a preferred embodiment of the present invention, it will be obvious to those skilled in the art that various changes and modifications may be made therein without departing from the invention as defined by the appended claims.

What is claimed is:

1. Receiving apparatus for processing binary encoded amplitude modulated RF signals comprising
   input means for receiving a binary encoded amplitude modulated RF signal;
   detector means coupled to said input means for producing from the received signal a signal having amplitude variations representing the binary modulating signal;
   reference voltage means for producing a DC reference voltage;
   amplifier means coupled to the detector means and to the reference voltage means for producing a signal which corresponds to said signal from the detector means and varies in amplitude about an axis at the DC reference voltage level;
   comparator means coupled to the amplifier means and to the reference voltage means for producing an output signal at a first voltage level when the voltage of the signal from the amplifier means is greater than the DC reference voltage and at a second voltage level when the voltage of the signal from the amplifier means is less than the DC reference voltage; and
   filter means coupled to said detector means and to said amplifier means for preventing high frequency signal components from being received by the amplifier means;
   said detector means including a superregenerative detector operable to oscillate at approximately the carrier frequency of the RF signal to be received;
   wherein said receiving apparatus includes
   a tuned circuit of an inductance and a first capacitance in parallel therewith, said turned circuit having a resonant frequency close to the carrier frequency of the RF signal to be received, and said inductance serving as a receiving antenna for the RF signal;
   a transistor having its collector connected to a juncture between the inductance and the first capacitance;
   a second capacitance connected between the other juncture of the inductance and the first capacitance and the base of the transistor; and
   a parallel arrangement of a resistance and a third capacitance connected between the emitter of the transistor and a source of reference potential.

2. Receiving apparatus for processing binary encoded amplitude modulated RF signals comprising
   input means for receiving a binary encoded amplitude modulated RF signal;
   detector means coupled to said input means for producing from the received signal a signal having amplitude variations representing the binary modulating signal;
   reference voltage means for producing a DC reference voltage;
   amplifier means coupled to the detector means and to the reference voltage means for producing a signal which corresponds to said signal from the detector means and varies in amplitude about an axis at the DC reference voltage level;

comparator means coupled to the amplifier means and to the reference voltage means for producing an output signal at a first voltage level when the voltage of the signal from the amplifier means is greater than the DC reference voltage and at a second voltage level when the voltage of the signal from the amplifier means is less than the DC reference voltage;

RF choke means connected between said detector means and said amplifier means for preventing the RF signal components in the detector means from being received by the amplifier means, and for coupling the detected amplitude variations from the detector means to the amplifier means;

low pass filter means coupled between the RF choke means and the amplifier means; and a unity gain buffer coupled between the low pass filter means and the amplifier means;

said detector means including a superregenerative detector operable to oscillate at approximately the carrier frequency of the RF signal to be received;

wherein said receiving apparatus includes a tuned circuit of an inductance and a first capacitance in parallel therewith, said tuned circuit having a resonant frequency close to the carrier frequency of the RF signal to be received, and said inductance serving as a receiving antenna for the RF signal;

a transistor having its collector connected to a juncture between the inductance and the first capacitance;

a second capacitance connected between the other juncture of the inductance and the first capacitance and the base of the transistor; and a parallel arrangement of a resistance and a third capacitance connected between the emitter of the transistor and a source of reference potential.

3. Receiving apparatus in accordance with claim 2 wherein said RF choke is connected to a tap along the length of the inductance.

* * * * *